March 2, 1954     O. F. ARTHUR     2,670,984
CRATE

Filed Feb. 12, 1952     5 Sheets-Sheet 1

INVENTOR.
OSCAR F. ARTHUR.
BY Archworth Martin
his ATTORNEY.

March 2, 1954   O. F. ARTHUR   2,670,984
CRATE

Filed Feb. 12, 1952   5 Sheets-Sheet 2

INVENTOR.
OSCAR F. ARTHUR.
BY Archworth Martin
his ATTORNEY.

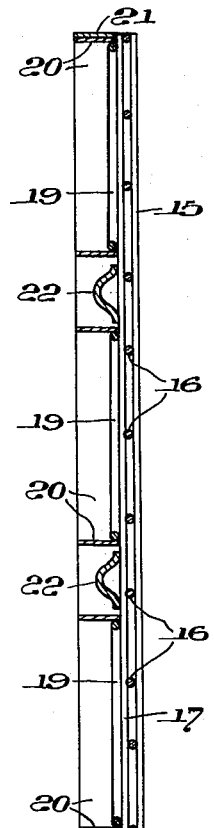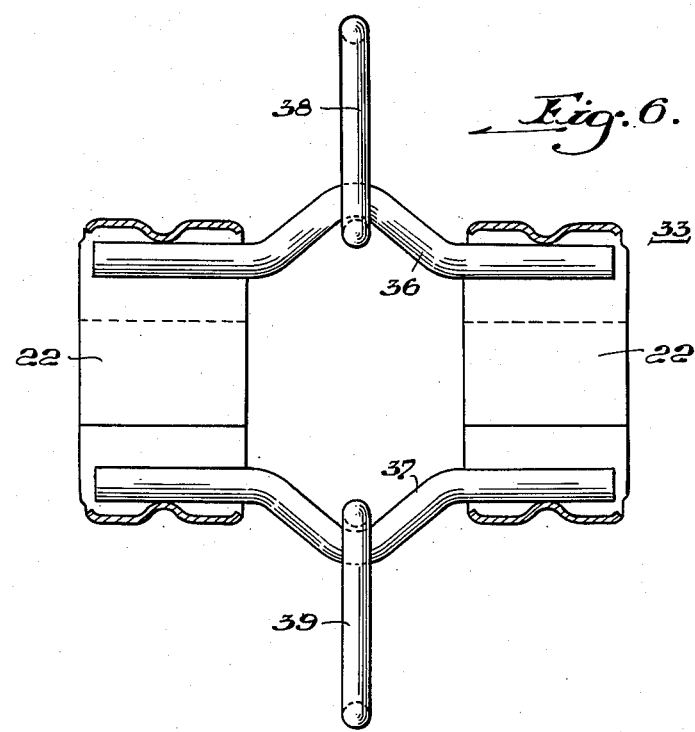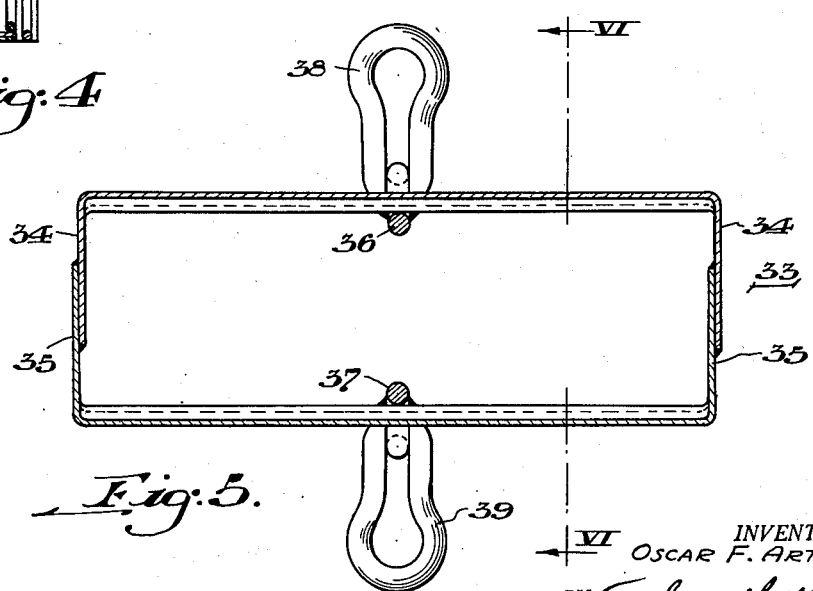

March 2, 1954  O. F. ARTHUR  2,670,984
CRATE
Filed Feb. 12, 1952  5 Sheets-Sheet 4

INVENTOR.
OSCAR F. ARTHUR
BY Archworth Martin
his ATTORNEY.

March 2, 1954 O. F. ARTHUR 2,670,984
CRATE

Filed Feb. 12, 1952 5 Sheets-Sheet 5

INVENTOR.
OSCAR F. ARTHUR
BY Archworth Martin
his ATTORNEY.

Patented Mar. 2, 1954

2,670,984

UNITED STATES PATENT OFFICE 2,670,984

CRATE

Oscar F. Arthur, Connellsville, Pa.

Application February 12, 1952, Serial No. 271,250

7 Claims. (Cl. 294—67)

My invention relates to crates that are especially suitable for use in carrying and storing articles such as ordnance shells or projectiles, the crate or carrier being sometimes designated as a "pallet adapter."

One object of my invention is to provide a carrier or crate of the type referred to that is especially suitable for holding a group of projectiles or the like in unitary relation while transporting them or storing them, and which can not only be made to suit shells of various lengths, but readily adaptable to shells of various diameters.

Another object of my invention is to provide a carrier top or crate top of such form that it is reversible to adapt it to shells having noses of various degrees of taper, in order that the said noses will be firmly held without projecting above the topmost plane of the holder.

Figure 1:
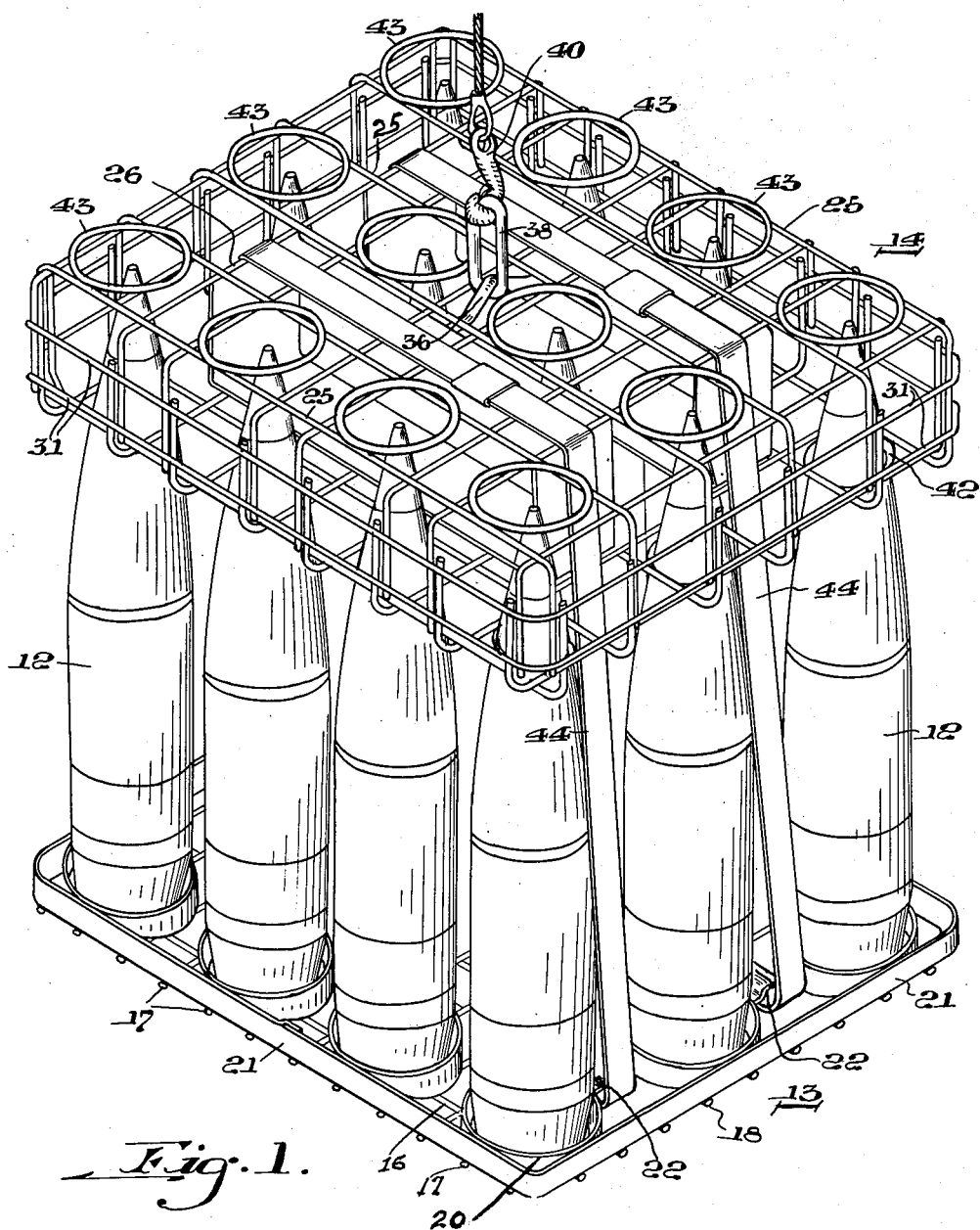
Figure 2:
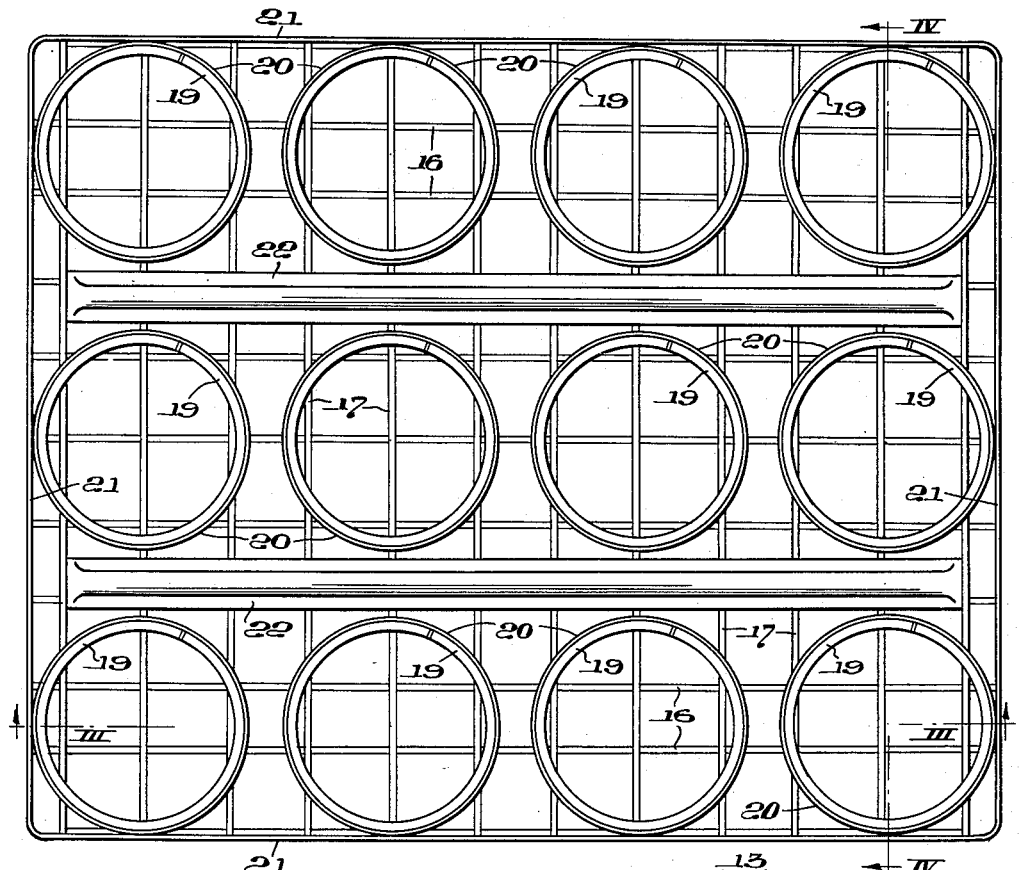
Figure 3:
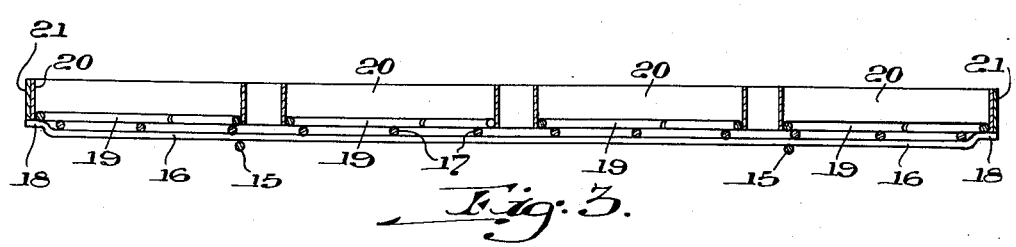
Figure 7:
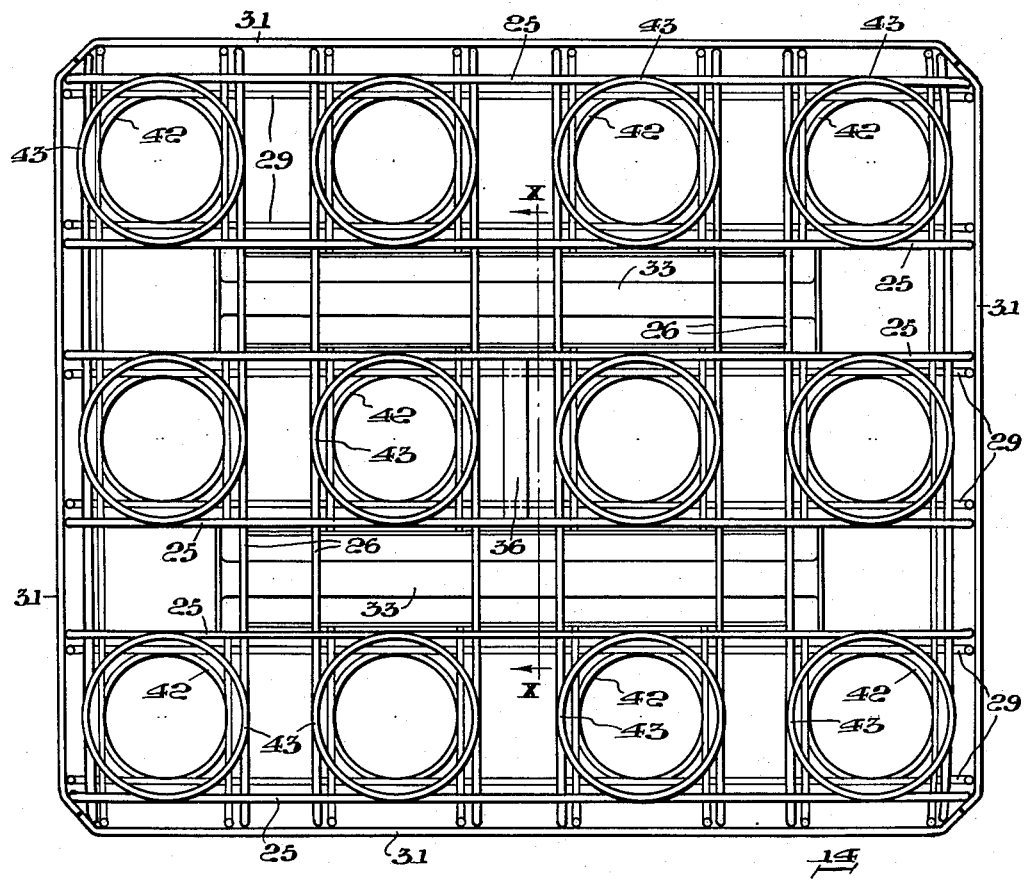
Figure 8:
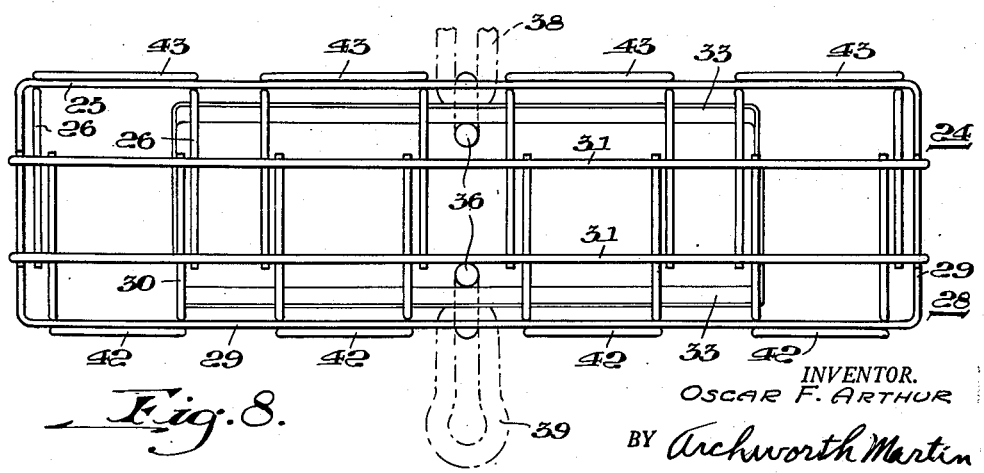
Figure 9:
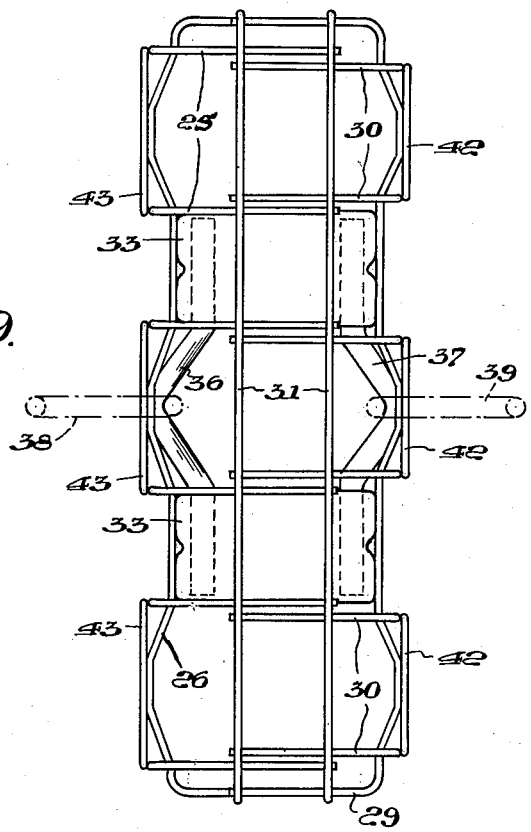
Figure 10:
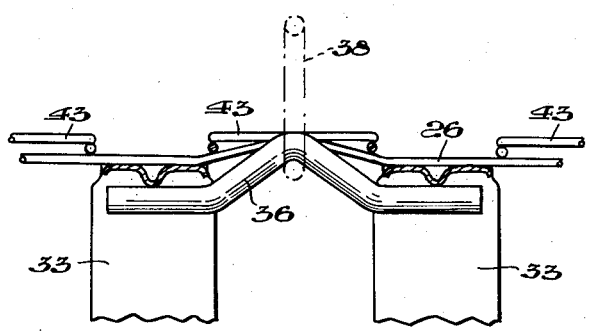

In the accompanying drawings, Figure 1 is a perspective view showing my crate in use; Fig. 2 is a plan view of the base portion of the crate of Fig. 1; Fig. 3 is a view taken on the line III—III of Fig. 2; Fig. 4 is a view taken on the line IV—IV of Fig. 2; Fig. 5 is a longitudinal sectional view of one of the beam-like members of the upper rack of Fig. 1; Fig. 6 is a view taken on the line VI—VI of Fig. 5; Fig. 7 is a plan view of the upper rack of Fig. 1; Fig. 8 is a side view thereof; Fig. 9 is an end view, and Fig. 10 is an enlarged view taken on the line X—X of Fig. 7.

As shown in Fig. 1, the crate or rack is employed for holding shells 12 in assembled relation, for transporting or stacking them as a unit. The base portion of the device is indicated by the numeral 13 and the upper portion thereof by the numeral 14.

Referring first to the structure of the base as shown in Figs. 2, 3 and 4, the base comprises rods or heavy wires 15, 16 and 17 welded together in relatively crossed relation, certain of the rods 16 having their ends bent upwardly at 18, as shown more clearly in Fig. 3, to make them flush with the topmost plane of the wires 17 and thereby afford better supporting surface for seating rings 19 that fit within the larger seating rings 20 that are welded to the uppermost surfaces of the wires 16 and 17. A band 21 extends around the entire group of seating rings 20 and is welded thereto and to the upwardly-bent ends 18 of the rods 16. Shells having the wider bases will seat within the rings 20 and upon the rings 19, while shells of lesser diameter as shown in Fig. 1 will seat within the rings 19 and upon the mesh members or deck wires 17 and be thereby held against shifting on the deck.

A pair of stiffening bars 22 of convex form in cross section extend lengthwise of the pallet and have their edges welded to the deck wires 17. These stiffeners serve the purpose of preventing bending of the pallet deck under load, when it is being hoisted.

Referring now to the upper portion of the carrier as shown in Figs. 5 to 10, this part of the crate structure comprises a mesh sheet 24 (Fig. 7) formed by welding wires 25 and 26 in relatively crossed relation, the ends of these wires being bent perpendicularly to the plane of the mesh, as shown more clearly in Figs. 8 and 9, so as to have telescopic connection with the lower part 28 of the rack. Similarly, the rack portion 28 is of lattice-like structure formed by welding longitudinally-extending rods 29 and transversely-extending rods 30 together in relatively crossed relation. The ends of the rods 29 and 30 are bent upwardly into generally telescopic relationship with the down-turned portions of the rods 25—26. These perpendicularly-bent portions of the upper and lower rack members are held together by hoop-like rods or bars 31 that encircle the complete structure and are welded to the said perpendicularly-bent portions of the rods 25—26 and 29—30.

A pair of beams or girders 33 shown more clearly in detail in Figs. 5 and 6 extend lengthwise of the crate and are contained within the upper framework 24, by being welded to the adjacent wires 26 and 30.

As shown more clearly in Fig. 5, each beam 33 has one portion 34 welded to a mating portion 35, in partly telescoped relation. Lifting bars 36 and 37 are welded within the beams 33 approximately midway between the ends of the beams, and have lifting links 38 and 39 respectively, carried thereby for connection with a hoist hook 40. The upper rack portion of Figs. 7 to 9 has, on one face thereof, seating rings 42 and on the other face has rings 43 for receiving the tapered ends of shells 12 of various sizes and holding them against lateral displacement.

For the smaller sizes of shells, small rings 42 are desirable, because the tapered noses of the smaller shells would project too far through larger rings such as 43 and would thus project beyond the uppermost plane of the carrier.

The top rack member 14 is therefore made reversible, to suit shells having noses of different diameters and, of course, one or the other of the links 38 or 39 will be available for connection to a hoisting cable.

When shells or other articles that are to be carried in assembled and unitary relation have been placed upon the base 13, the cap member 14 is applied. Thereupon, metal straps 44 are inserted beneath the wires 17 and channel-like bars 22 of the base and laid across the upper sides of the rods 26, immediately above the beams 33, the ends of each strap being then secured together by a suitable strapping machine.

The beams 33 are of somewhat shorter length than the base bars, so that the straps 44 slope somewhat inwardly toward the top of the carrier. This brings the stresses on the upper rack closer to the hanger links 38—39, so that there will be less bending stress on the upper rack than if the traps extended up around the endmost edges thereof.

The straps 44 are protected somewhat from damage, since at the bottom they are parallel to and between mesh wires 16 that are disposed below the wires 17. At the top of the carrier, they rest upon mesh wires 26 and are between adjacent mesh wires 25.

I claim as my invention:

1. A rack-like device for engaging and retaining in place the upper ends of articles that are supported upon a base, comprising a rack having two groups of ring-like seats for receiving the noses of tapered articles supported on the base, the two groups being of different diameters and disposed in two vertically-spaced planes, two beams mounted within the rack, to either side of seats adjacent to a horizontal median line through the rack, lifting bars respectively bridging the beams at their upper and lower sides, means for releasably connecting the rack to the base, and lifting links connected to the bars, the rack being reversible for selective engagement of its seats with articles of different diameters.

2. A rack-like device for engaging and retaining in place the upper ends of articles that are supported upon a base, comprising a rack having two groups of ring-like seats for receiving the noses of tapered articles supported on the base, the two groups being of different diameters and disposed in two vertically-spaced planes, two beams mounted within the rack, to either side of seats adjacent to a horizontal median line through the rack, lifting bars respectively bridging the beams at their upper and lower sides, lifting links connected to the bars and means for releasably connecting the rack to the base, the rack being reversible for selective engagement of its seats with articles of different diameters, and comprising two lattice-like members that are connected in perpendicularly-spaced relation to each other.

3. A rack-like device for engaging and retaining in place the upper ends of articles that are supported upon a base, comprising a rack having two groups of ring-like seats for receiving the noses to tapered articles supported on the base, the two groups being of different diameters and disposed in two vertically-spaced planes, two beams mounted within the rack, to either side of seats adjacent to a horizontal median line through the rack, lifting bars respectively bridging the beams at their upper and lower sides, lifting links connected to the bars, and means for releasably connecting the rack to the base, the rack being reversible for selective engagement of its seats with articles of different diameters, and comprising two lattice-like members that are connected in perpendicularly-spaced relation to each other, by edge portions thereof bent toward one another and secured together.

4. A rack-like device for engaging and retaining in place the upper ends of articles that are supported upon a base, comprising a rack having two groups of ring-like seats for receiving the noses of tapered articles supported on the base, the two groups being of different diameters and disposed in two vertically-spaced planes, two beams mounted within the rack, to either side of seats that are adjacent to a horizontal median line through the rack, a lifting bar bridging the beams, means for releasably connecting the rack to the base, and a lifting link connected to the bar, the rack being reversible for selective engagement of its seats with articles of different diameters.

5. A rack-like device for engaging and retaining in place the upper ends of articles that are supported upon a base, comprising a rack having two groups of ring-like seats for receiving the noses of tapered articles supported on the base, the two groups being of different diameters and disposed in two vertically-spaced planes, two beams mounted within the rack, to either side of seats adjacent to a horizontal median line through the rack, a lifting bar bridging the beams, a lifting link connected to the bar, the rack being reversible for selective engagement of its seats with articles of different diameters, a base having a pair of stiffening bars disposed beneath and parallel to the beams, and suspending members connecting the ends of these bars to the beams.

6. A rack-like device for engaging and retaining in place the upper ends of articles that are supported upon a base, comprising a rack having two groups of ring-like seats for receiving the noses of tapered articles supported on the base, the two groups being of different diameters and disposed in two vertically-spaced planes, two beams mounted within the rack, to either side of seats adjacent to a horizontal median line through the rack, a lifting bar bridging the beams, a lifting link connected to the bar, the rack being reversible for selective engagement of its seats with articles of different diameters a base having a pair of stiffening bars disposed beneath and parallel to the beams, and straps of looped form extending longitudinally beneath the bars and along the tops of the beams.

7. A crate-like carrier comprising a fabricated metal base having stiffening bars welded to an undersurface thereof, to either side of and adjacent to its mid line lengthwise of the base, an upper rack of fabricated rods having ring-like retaining members spaced from one another horizontally to receive the upper ends of articles supported on the base and hold them against lateral displacement, stiffening bars welded to the rack along lines to either side of the lengthwise center line of the rack, a lifting link carried by these bars, at said center line, and straps connecting the lower bars to the rack, the upper and lower stiffening bars all being in approximate parallelism with one another and the lower bars having channel-like grooves for receiving the said straps that are looped through the grooves and along the tops of the first-named bars to hold the rack member in position to retain the articles in place.

OSCAR F. ARTHUR.

References Cited in the file of this patent

UNITED STATES PATENTS

| Number | Name | Date |
|---|---|---|
| 1,369,323 | Clairemont | Feb. 22, 1921 |
| 1,762,271 | Hutchins | June 10, 1930 |
| 1,991,481 | Woodbridge | Feb. 19, 1935 |
| 2,235,719 | Matarese | Mar. 18, 1941 |
| 2,452,392 | Philbin | Oct. 26, 1948 |
| 2,466,875 | Brandt | Apr. 12, 1949 |
| 2,487,687 | Arthur et al. | Nov. 8, 1949 |
| 2,530,797 | Arthur | Nov. 21, 1950 |
| 2,546,830 | McKim | Mar. 27, 1951 |
| 2,556,844 | Istwan | June 12, 1951 |